No. 728,507. Patented May 19, 1903.

UNITED STATES PATENT OFFICE.

JAMES AITKEN SHEPHERD, OF GLASGOW, SCOTLAND.

COMPOSITION FOR USE IN THE MANUFACTURE OF LINOLEUM OR LIKE COATED FABRICS.

SPECIFICATION forming part of Letters Patent No. 728,507, dated May 19, 1903.

Application filed February 10, 1903. Serial No. 142,794. (No specimens.)

*To all whom it may concern:*

Be it known that I, JAMES AITKEN SHEPHERD, a subject of the King of the United Kingdom of Great Britain and Ireland, residing at Bellavista, Kelburn avenue, Dumbreck, Glasgow, Scotland, have invented a certain new and useful Composition for Use in the Manufacture of Linoleum or Like Coated Fabrics (for which application for patent has been made in Great Britain, No. 14,169, dated June 23, 1902,) of which the following is a specification.

This invention has for its object to provide a composition of matter specially suited for mixing with the other ingredients commonly employed in the manufacture of linoleum, floor-cloth, and like coated fabrics, the said composition having properties which impart flexibility to the finished goods and render them less liable to crack.

The improved composition is made up of boiled linseed-oil, gum-tragasol—namely, the gum obtained by the process set forth in the patent to Castle, No. 566,497—and a drier, such as litharge. Suitable proportions, which may, however, be varied, are of boiled linseed-oil, fifteen parts, by weight; gum-tragasol, five parts, and of driers one-half part.

Having now described my invention, what I claim, and desire to secure by Letters Patent, is—

A composition of matter for use in the manufacture of linoleum, floor-cloth and like coated fabrics, consisting of linseed-oil, gum-tragasol and a drier intimately mixed in or about the proportions stated.

In witness whereof I have hereunto set my hand in presence of two witnesses.

JAMES AITKEN SHEPHERD.

Witnesses:
WALLACE CRANSTON FAIRWEATHER,
JNO. ARMSTRONG, Jr.